United States Patent
Wyatt et al.

(10) Patent No.: US 7,114,168 B1
(45) Date of Patent: Sep. 26, 2006

(54) METHOD AND APPARATUS FOR DETERMINING SCOPE OF CONTENT DOMAIN

(75) Inventors: David A. Wyatt, San Jose, CA (US); Robert W. Faber, Hillsboro, OR (US); David A. Lee, Beaverton, OR (US); Brendan Traw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1078 days.

(21) Appl. No.: 09/675,823

(22) Filed: Sep. 29, 2000

(51) Int. Cl.
*H04N 7/167* (2006.01)
(52) U.S. Cl. .................. 725/31; 726/2; 726/26
(58) Field of Classification Search .................. 725/25, 725/31; 386/46, 94, 95; 709/227, 228, 229; 713/200, 201, 202, 153, 160, 161, 168; 380/201, 380/211, 240, 242; 726/2, 4, 5, 14, 26, 29
See application file for complete search history.

(56) References Cited

U.S. PATENT DOCUMENTS 5,710,815 A * 1/1998 Ming et al. .................. 380/241
6,069,647 A * 5/2000 Sullivan et al. ............... 725/29
RE38,055 E * 4/2003 Tsukamoto et al. ......... 280/240
2003/0115324 A1 * 6/2003 Blumenau et al. .......... 709/225

* cited by examiner

*Primary Examiner*—John Miller
*Assistant Examiner*—Dominic Saltarelli
(74) *Attorney, Agent, or Firm*—Joni D. Stutman-Horn

(57) ABSTRACT

A method and apparatus for determining the scope of a content domain for ensuring that a content stream is not re-routed to an unauthorized display device. The apparatus includes a content source device, which supports multiple display outputs coupled to one or more content sink devices. A content source application generates and provides a content stream to a hardware interface which securely transmits the content stream to a protected content sink device using a content protection protocol. The content source application utilizes certain status information to ensure that the content stream is not re-routed to an unprotected or unapproved content sink device. The source application requests the updated session identification code from the transmitter/codec unit using the content protection protocol which is compared against the expected session identification code to ensure that the content display stream has not been re-routed to an unprotected content sink device.

17 Claims, 9 Drawing Sheets

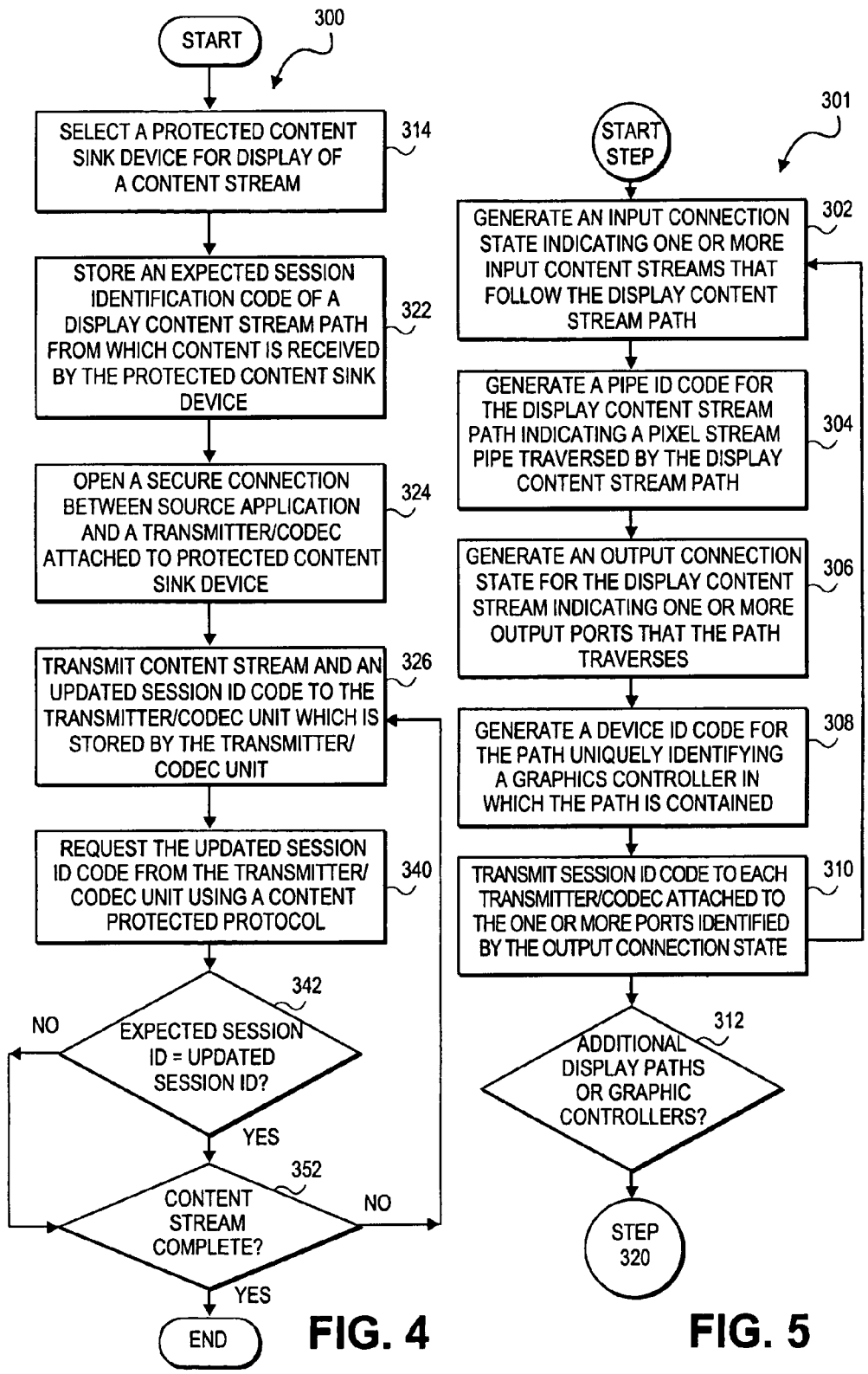

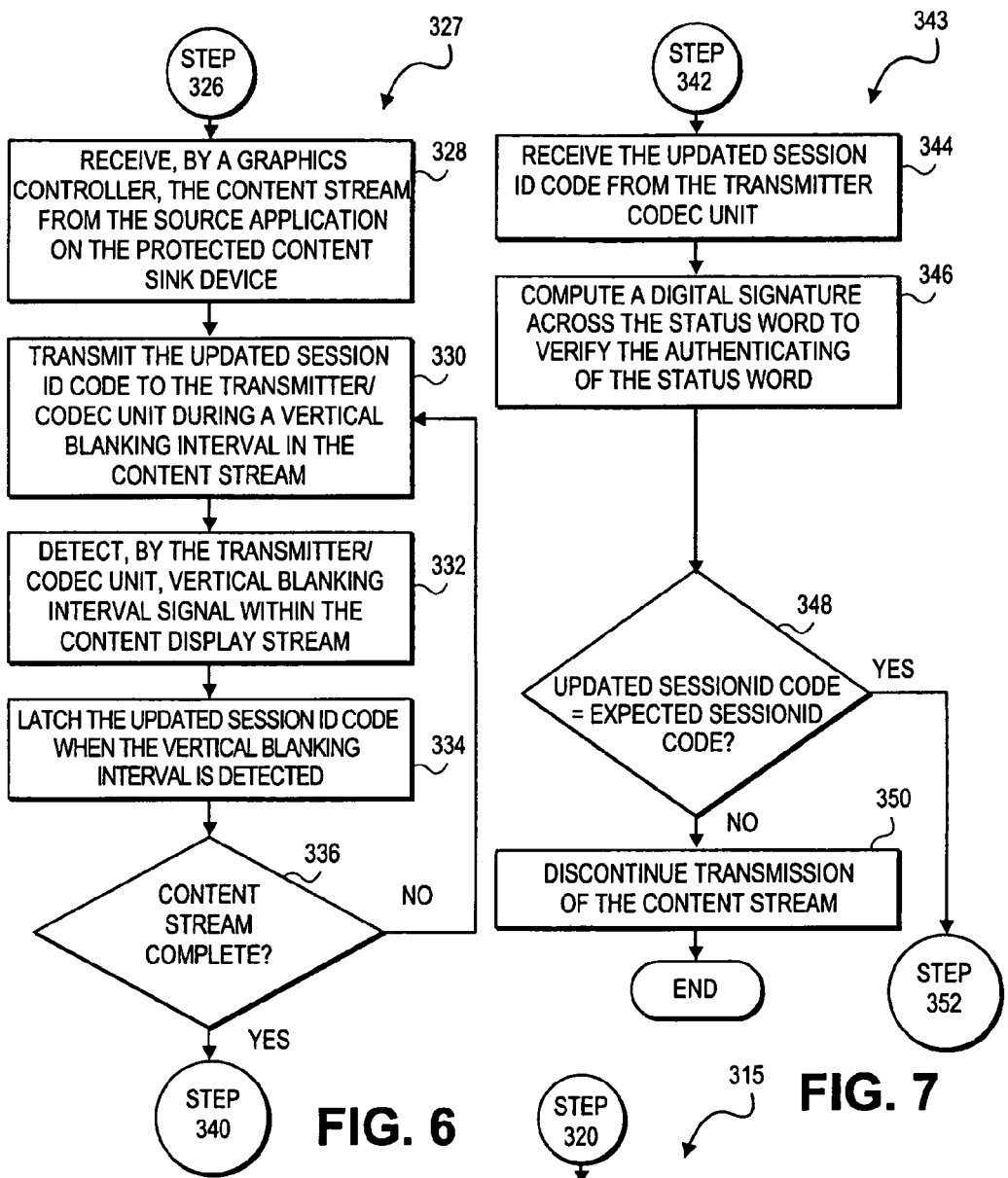

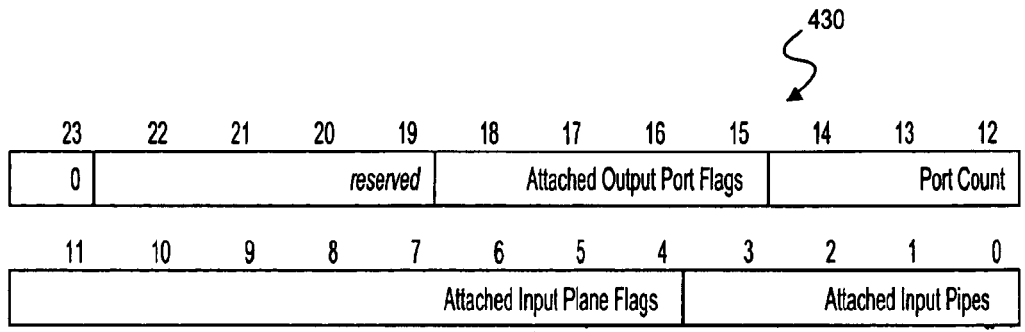

| Packet | Bit | Description |
|---|---|---|
| N+1 | 23 | Header Enable:<br>0 = This is Not a Header Pixel |
| | 22:15 | Port Attach State Flags: ~~ 432<br>One bit flags for each of the ports which is attached to this Pipe<br> Bit 19 ~ 22 = value undefined, reserved<br> Bit 18 = Output 4 (DVO-C) is attached<br> Bit 17 = Output 3 (DVO-B) is attached<br> Bit 16 = Output 2 (DVO-A) is attached<br> Bit 15 = Output 1 Non-HDCP* (Analog CRT) is attached |
| | 14:12 | Number of Ports: ~~ 434<br>The number of valid fields in the Port Attach flags which CAN be connected.<br> This value is fixed per Controller, for Almador the number of Planes is 4<br> (includes CRT, DVO-A/B/C) |
| | 11:4 | Plane Attache Flags: ~~ 436<br>Bit Flags for planes (Display & Overlay), which can be attached to the pipe.<br> Bit 8~ 11 = reserved<br> Bit 7 = Overlay is attached<br> Bit 6 = Display C is attached<br> Bit 5 = Display B is attached<br> Bit 4 = Display A is attached |
| | 3:0 | Pipe Attach: ~~ 438<br>The index number of Pipe, which is the source of the Digital Video Pixel Stream<br> Bit 2-3 = value undefined, reserved<br> Bit 1 = Pipe B<br> Bit 0 = Pipe A |

FIG. 11

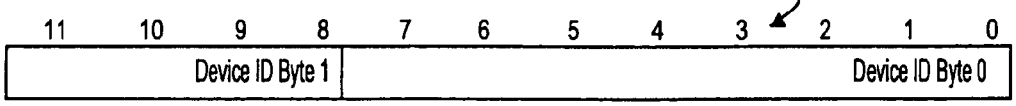
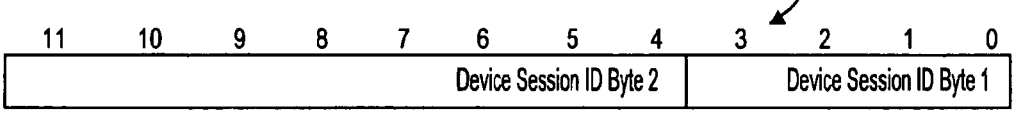
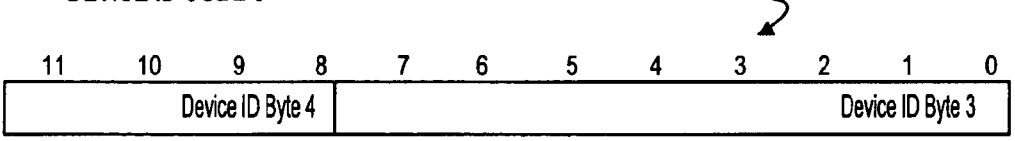
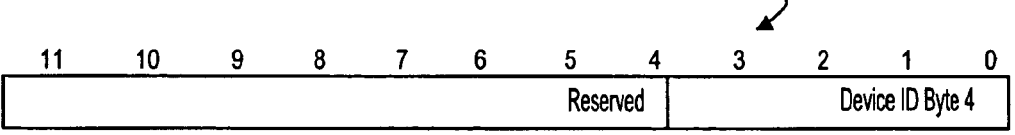
FIG. 12

METHOD AND APPARATUS FOR DETERMINING SCOPE OF CONTENT DOMAIN

FIELD OF THE INVENTION

The present invention relates generally to the field content protection. In particular, the present invention relates to an apparatus and method for determining the scope of a content domain in order to ensure that a content stream is not routed to an unprotected or unauthorized display device.

BACKGROUND OF THE INVENTION

In general, entertainment, education, art and so forth (hereinafter collectively referred to as "content") packaged in digital form offer higher audio and video quality than their analog counterparts. However, content producers, especially those in the entertainment industry, are still reluctant in totally embracing the digital form; the primary reason being that digital contents are particularly vulnerable to pirating. Unlike the analog form, where some amount of quality degradation generally occurs with each copy, a pirated copy of digital content is virtually as good as the "gold master." As a result, much effort has been spent by the industry in developing and adopting techniques to provide protection for the distribution and rendering of digital contents.

Historically, the communication interface between a video source device (such as a personal computer) and a video-sink device (such as a monitor) is an analog interface. Thus, very little focus has been given to providing protection for the transmission between video sources and video sink devices. With advances in integrated circuits and other technologies, a new type of digital interface between video source and video sink devices is emerging. The availability of this type of new digital interface presents yet another new challenge to protecting digital video content. Similarly, production challenges exist for exchanges of status values between the video generating video source application and the video transmitting video hardware interface of the video source device.

In particular, protecting content displayed on systems capable of supporting multiple display outputs presents a serious problem. In such systems, it is necessary to ensure that premium content ends up on a desired output in which it can be protected. Moreover, some premium content may contain a restriction prohibiting it from being displayed on certain types of display devices (e.g., analog devices), which do not provide content protection. Although current methods for digital content protection can enable video hardware interfaces to securely transmit digital video to external video sink devices, these methods do not provide a simple mechanism for verifying that the content arrived at the protected display. Moreover, systems supporting multiple display outputs are subject to rewiring of input and output selection devices, such that rogue agents may (trivially) re-wire these input and output devices using software accessible chip registers in order to re-direct premium content streams to unprotected or undesired display devices.

BRIEF DESCRIPTION OF THE DRAWINGS

The features, aspects, and advantages of the present invention will become more fully apparent from the following detailed description and appended claims when taken in conjunction with accompanying drawings in which:

FIG. 4 is a flow chart illustrating method steps for determining the scope of a content domain in order to prevent content from being routed to an unprotected or unauthorized display device in accordance with an embodiment of the present invention;

FIG. 5 is a flow chart illustrating additional method steps for determining the scope of a content domain in accordance with a further embodiment of the present invention;

FIG. 6 is a flow chart illustrating additional method steps for transmitting a content stream in accordance with a further embodiment of the present invention;

FIG. 7 is a flow chart illustrating additional method steps for determining whether a content stream has been re-routed in accordance with an exemplary embodiment of the present invention;

FIG. 8 is a flow chart illustrating additional method steps for selecting a protected content sink device in accordance with an exemplary embodiment of the present invention;

FIG. 11 depicts a connection state or session identification code packet which is transmitted to a respective transmitter/codec unit in accordance with a further embodiment of the present invention; and FIG. 12 depicts packets used to transmit a unique device identification code in accordance with an exemplary embodiment of the present invention.

DETAILED DESCRIPTION OF THE INVENTION

The present invention overcomes problems in the existing art described above by providing an apparatus and method for determining the scope of a content domain in order to ensure that a content stream is not routed to an unprotected or unauthorized display device. In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In a certain embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD (compact disc)-ROMs (read only memories), and magneto-optical disks, ROMs, RAMs (random access memories), EPROMs (erasable programmable read only memories), EEPROMs (electrically erasable programmable read only memories), magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

System Architecture

Figure 1:
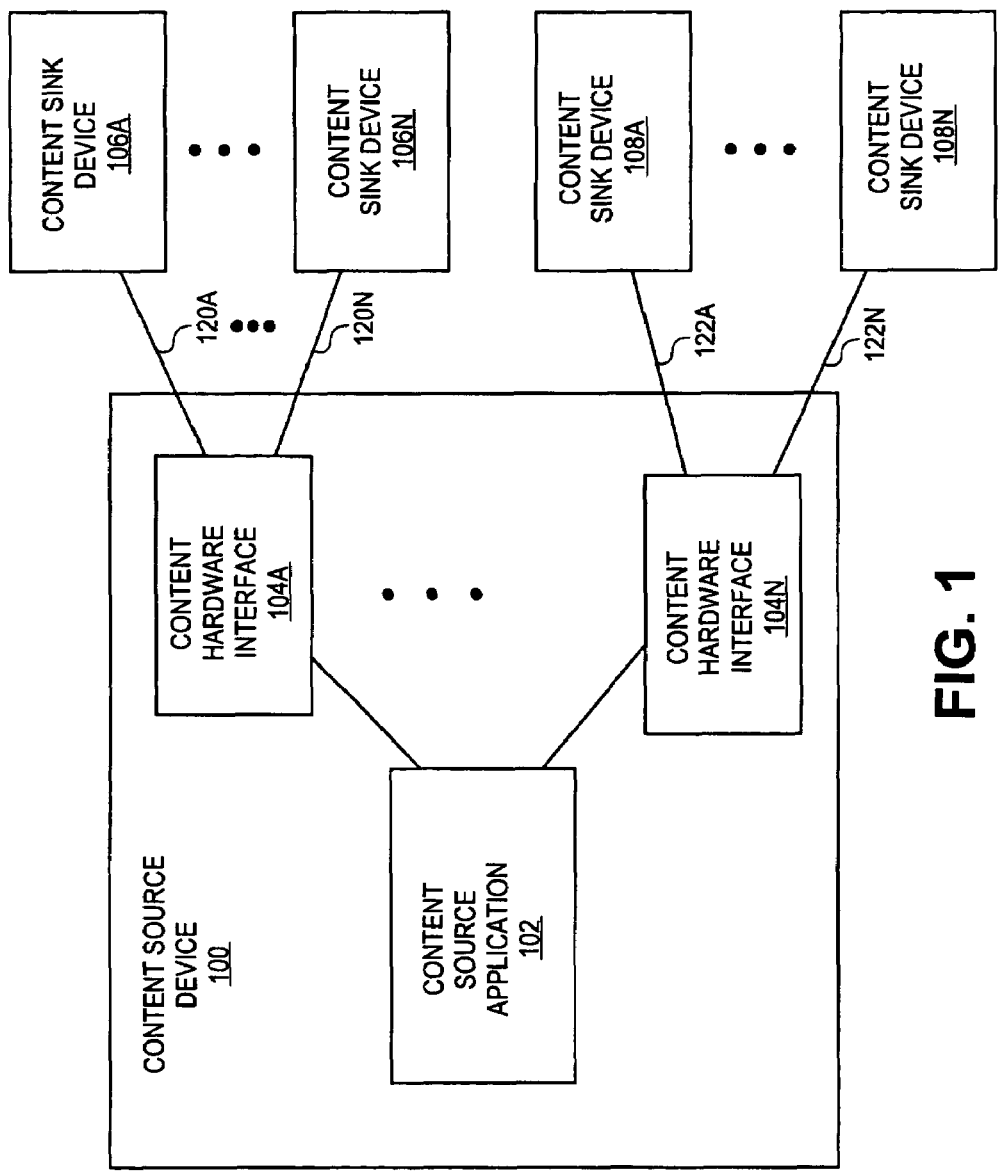
FIG. 1 depicts a block diagram illustrating a content source device in accordance with an embodiment of the present invention.

Referring now to FIG. 1, a block diagram of a content source device 100 is illustrated in accordance with an embodiment of the present invention. The content source device 100 supports multiple display outputs including one or more content sink devices 106 (106A, ..., 106N) and 108 (108A, ..., 108N), which are respectively coupled to the content source device 100 via digital content links 120 (120A, ..., 120N) and 122 (122A, 122N). The content source device 100 includes content source application 102 and one or more content hardware interfaces 104 (104A, ..., 104N). The content source application 102 generates and provides a content stream to the one or more content hardware interfaces 104 which securely transmit the content stream to an external content sink device, such as content sink device 106, using a content protection protocol. Additionally, content source application 102 and video hardware interface 104 exchange various status and control information, including particular status information about the link between the content hardware interface 104 and the content sink device 106. As a result, the content source application 102 is able to select a protected content sink device 106 for display to a content stream, as described in further detail below.

As described herein, the content source application 102 is intended to represent a broad range of content source applications as known in the art, while the content hardware interface 104 is intended to represent a broad range of hardware applications for providing content streams to content sink devices including, but not limited to, graphics controllers. As will be readily apparent to those skilled in the art, the present invention advantageously allows a content source application to select a protected content sink device for display of a content stream and utilizes certain status information to ensure that the content stream is not re-routed to an unprotected or unapproved content sink device during display of the content stream.

Examples of the content source device 100 include, but are not limited to, computers of all sizes (from palm size devices to desktop devices, to server computers and beyond), set-up boxes or DVD players, which support multiple display outputs. Examples of content sink devices include, but are not limited to, both analog and digital devices including CRT monitors, flat panel displays or television sets, notebooks and embedded platforms with non-user-accessible internal displays, in addition to optional external user-accessible display interfaces. As to digital content links 120 and 122, the digital content links may be implemented in any one of a number of mechanical and electrical forms as long as they are consistent with the operating requirements (i.e., speed, bit rate and so forth), and a mechanism (which may be in hardware or through protocol) is provided to allow control information to be exchanged between the content source application 102 and content sink devices 106 and 108.

Before proceeding to further descriptions of the present invention, and in order to provide ease of understanding, content source application 102, as depicted, interacts "directly" with content hardware interface 104. However, those skilled in the art will appreciate that typically, the content hardware interface 104 has an associated software driver to insulate the hardware specifics from the interacting software, such as content source application 102. Accordingly, in most embodiments, the content source application 102 interacts with content hardware interface 104 through its associated driver.

Figure 2:
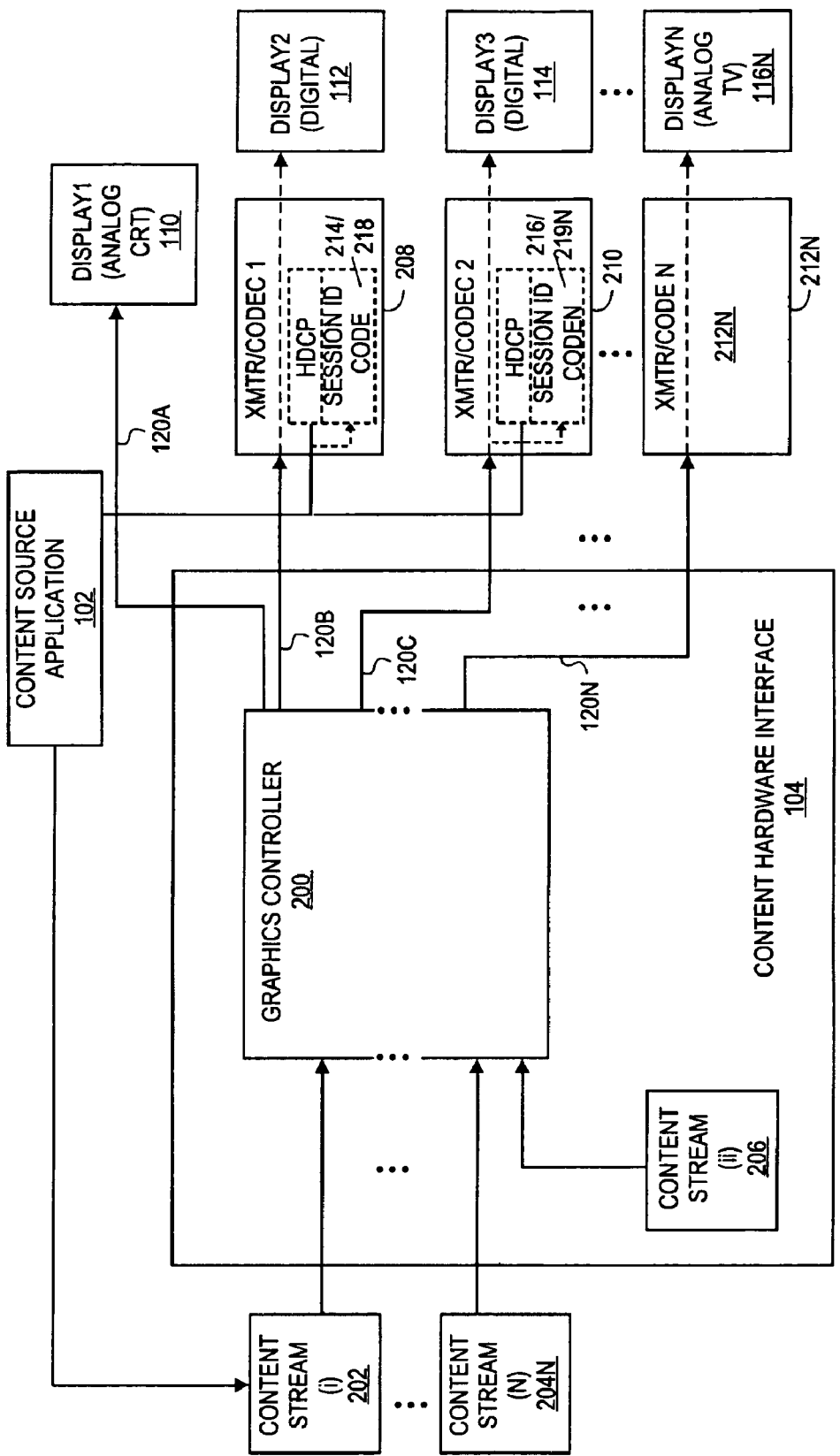
FIG. 2 depicts a block diagram illustrating a content-hardware interface including a graphics controller in accordance with a further embodiment of the present invention.

Referring now to FIG. 2, the content hardware interface 104 is further illustrated, including a graphics controller 200, supporting multiple display outputs, in accordance with a further embodiment of the present invention. The content hardware interface 104 includes external input content streams (202, ..., 204N), as well as internal content stream 206, which are provided as inputs to the graphics controller 200. One or more transmitter/codec units (208, 210, ..., 212N) are each attached to the graphics controller 200 via a digital content link 120 (120A, ..., 120N) along a respective display content stream path (as described in further detail below) from which content is received. Each transmitter/codec unit (208, 210, ..., 212N) stores an expected session identification code (218, ..., 219N) identifying the respective display content stream path from which content is received by the transmitter/codec unit.

A first transmitter/codec unit 208 is coupled to a first digital display device 112 and initially stores an unexpected session identification code 218. A second transmitter/codec 210 is coupled to a second digital display device 114 and also initially stores an expected session identification code 219N. An analog CRT display device 110 is also connected to the graphics controller 200, while a final transmitter/codec 212N connects an analog TV display device 116N to the graphics controller 200. Once the graphics controller 200 begins transmitting content to the transmitter/codec units (e.g., 208/210), the graphics controller 200 periodically generates an updated session identification code (214, ... 216N) reflecting a display content stream path used to transmit the content. The updated session identification code is periodically transmitted to the transmitter/codec units 208/210, within the content, and is stored by the transmitter/codec units 208/210.

The content transmitted by the graphics controller 200 is eventually displayed by the one or more content sink devices (110, 112, 114, ..., 116N) attached to the graphics controller 200, such as, for example, the first digital display device 112. The content source application 102 selects a protected content sink device from the one or more content sink devices (110, 112, 114, . . . , 116N) attached to the graphics controller 200 and stores an expected session identification code (218, . . . , 219N). A protected content sink device, as described herein, refers to a content sink device which implement a content protection protocol (as described in further detail below) prohibiting unauthorized use of displayed content.

Once the content source application 102 has selected a protected content sink device, such as content sink device 112, the content source application 102 opens a secure connection with a transmitter/codec unit, such as the first transmitter/codec unit 208, which is attached to the protected content sink device 112. Once the connection is open, the content source application 102 requests the updated session identification code 214 from the transmitter/codec unit 208 using the content protection protocol. Once the updated session identification code 214 is received, it is compared against the expected session identification code 218 to ensure that the content stream has not been re-routed to an unprotected content sink device, such as, for example, analog TV 116N or analog CRT 110.

Figure 3A:
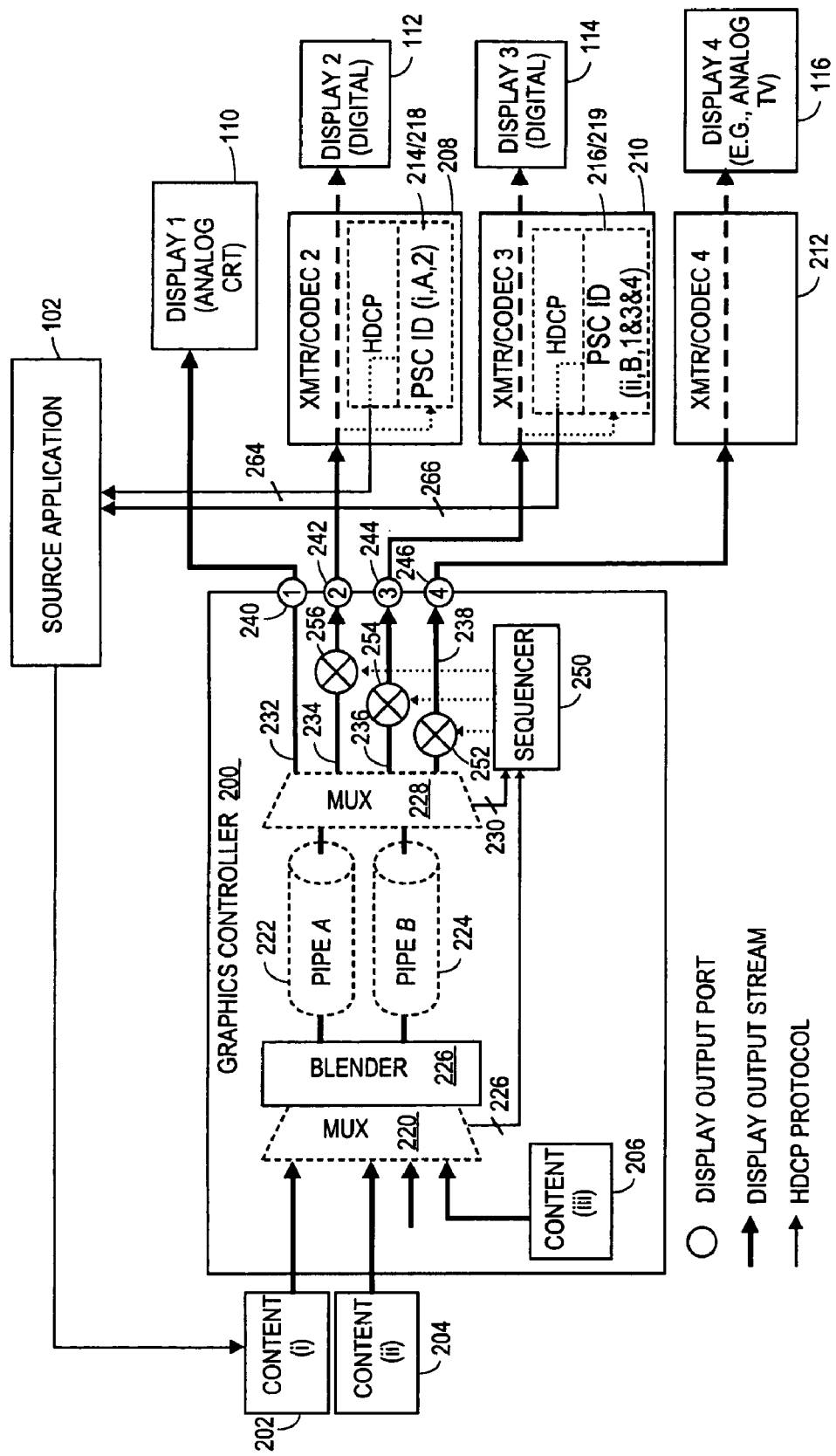
FIG. 3A depicts a block diagram illustrating the graphics controller depicted in FIG. 2 according to an exemplary embodiment of the present invention.

FIG. 3A depicts the graphics controller 200 according to an exemplary embodiment of the present invention. The graphics controller 200 includes an input selection device 220 having one or more display planes having input content streams (202, 204, 206) as inputs, and one or more pixel stream pipes (222, 224) as outputs. The input selection device 220 receives a content stream 202 from the content source application 102; using input selection information 226, the content stream 202 is directed to a pixel stream pipe (e.g., 222) along a display content stream path identified by the updated session identification code 214. The graphics controller 200 also includes a blender 280 that receives the content stream 202. Once received, the blender 280 mixes context planes within the content stream 202 into a content pixel stream, prior to being provided to the pixel stream pipe 222/224. An output selection device 228 includes the one or more pixel stream pipes 222/224 as inputs and one or more output ports (232, 234, 236, 238) as outputs. The output selection device 228 receives the content pixel stream 202 from the pixel stream pipe 222 and directs the content pixel stream 202 to an output port (e.g., 234) along the display content stream path using output selection information 230. A sequencer 250 transmits the updated session identification code 214 to the transmitter/codec unit 208 during, for example, a vertical blanking interval in the content stream 202 provided by the content source application 102 (as described below). However, those skilled in the art will realize that the updated session identification code can be transmitted during virtually any interval in the content stream 202. The sequencer 250 combines the updated session identification code 214 with content streams carried along the various output ports (232, 234, 236, 238) using the mixer gates (252, 254, 256), as known in the art.

Figure 3B:
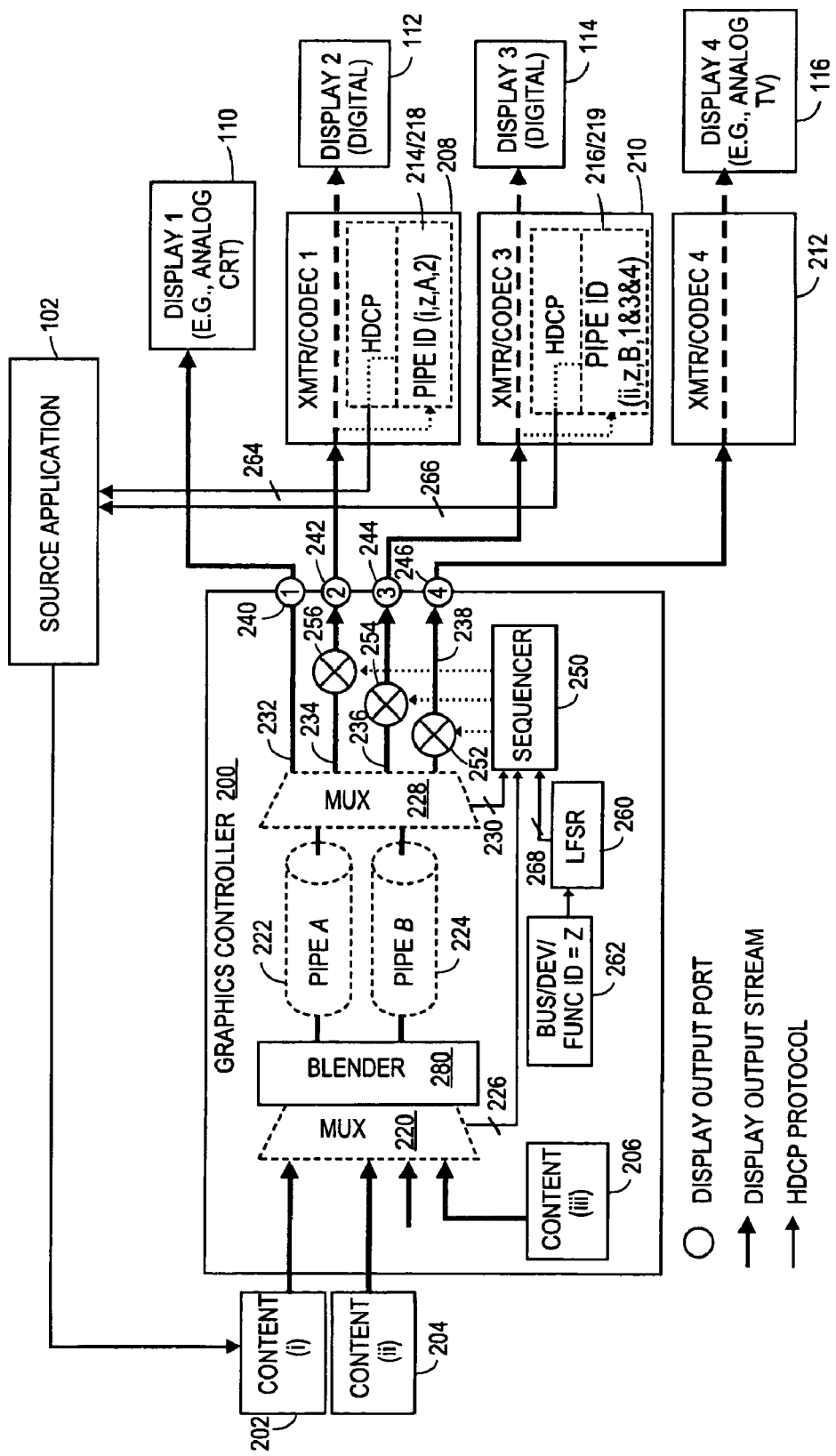
FIG. 3B depicts a block diagram illustrating the graphics controller depicted in FIG. 2 according to an exemplary embodiment of the present invention.

In order to support content source devices including multiple content hardware interfaces, the graphics controller 200 may optionally include a linear feedback shift register 260 as depicted in FIG. 3B. The linear feedback shift register (LFSR) 260 receives a plug & play device identification code (device ID code) 262 of a respective graphics controller. Once received, the LFSR 260 is clocked at a pixel rate of the content display stream 202 in order to ensure that the device ID code 262 of the respective graphics controller is unique. The value loaded into the LFSR 260 as the seed should be a unique value in order to ensure that all graphics controllers in the content source device are represented by unique values. A plug & play device ID code 262 is used since it is the best example of adapter/graphics controller uniqueness, which can distinguish a graphics controller from other (or multiple) adapters/controllers in the system. The LFSR 260 is, for example, a 40-bit LFSR. The LFSR provides additional entropy to increase the uniqueness, for example, when many devices of the same type are installed.

Consequently, the updated session identification code 214 generated by the graphics controller 200, for the content display stream path, includes: (a) the input selection information 226, (b) the output selection information 230, (c) a pipe identification code identifying the pixel stream pipe traversed by the content stream 202 and (d) the unique device code 262 as depicted, for example, in FIGS. 11 and 12. This updated session identification code 214 is periodically requested by the source application 102 and compared against the expected session identification code 218, which was received by the source application 102 when it selected the protected content sink device 208.

The updated session identification code 218 is periodically generated by the graphics controller 200 in order for the source application 102 to detect whether a rogue agent has re-wired connections within the graphics controller 200. Unless prevented, the rogue agent can re-route the content stream 202 to an unprotected content sink device such as analog CRT 110 or analog television 116 along a modified display stream path. For example, the source application 102 initially selected, as the protected content sink device, the first digital display device 112, which is coupled to the graphics controller 200 by the first transmitter/codec unit 208. Based on the expected session identification code 218 initially stored by the first transmitter/codec unit 208, the content stream 202 proceeds along a display content stream path as follows. The content stream 202 is originally received by the input selection device 220 and routed to pixel stream pipe A 222 based on the input selection information 226. The content stream 202 then proceeds to the output selection device 228. The output selection device 228 then routes the content stream 202 received from the pixel stream pipe 222 to an output port 234, which proceeds along to the first transmitter/codec unit 208. The content stream 202 is then displayed by the first digital display device 112.

Consequently, the display content stream path includes: routing the content stream 202 received at the input selection device 220 to pipe A 222; the content stream 202 is then routed by the output selection device 228 to output port 234; and finally the content stream 202 is received at the transmitter/codec unit 208 via an output port 242, for display by the first digital display device 112. Alternatively, input content streams are routed by the input selection device 220 to pixel stream pipe B 224 and routed, by the output selection device 228, to output ports 232, 236 and 238, along an alternate display content stream path. Content routed along this alternate display content stream path is eventually displayed by analog CRT 110 digital display device 114 and analog TV 116. Therefore, a rogue agent desiring to re-route the content stream 202 could modify the input selection information 226 to route the content stream to pixel stream pipe B 224.

Alternately, the output selection device 228 could be re-routed, such that content streams received from pixel stream pipe A 222 would be routed to either analog CRT 110 or analog TV 116. Once received at either analog CRT 110 or analog TV 116, the content stream 202 could be easily replicated using an analog replication device such as a video cassette recorder. The transmitter/codec units 208, 210 and 212, as well as sink device 110, are coupled to the graphics controller 200 via digital visual output (DVO) ports 242 and 244 as manufactured by the Intel Corporation. The DVO is a digital connection device that continuously streams pixels to attached devices.

In order for the content source application 102 to select a protected content sink device from the one or more content sink devices (110–116) attached to the graphics controller 200, the source application 102 acquires information regarding each of the content sink devices (110–116). In order to receive this information, the source application 102 may request a graphics driver (not shown) to provide mode information for each content sink device (110–116) attached to the graphics controller 200. This mode information describes the display content stream path used by the graphics controller 200 to route content to an attached content sink device (110–116). Consequently, the source application 102 uses the mode information provided by the graphics driver to select, as a protected content sink device, a content sink device implementing a content protection. This content protocol should prevent unauthorized duplication of content displayed by the content sink device.

In the current example, the second digital display 114 would not be selected because content routed to pixel stream pipe B 224 is available to unprotected display devices 110 and 116. The content protection protocol is, for example, the high-bandwidth digital content protection (HDCP protocol, version 1.0, Intel Corporation, Feb. 17, 2000). The HDCP technology requires adherence to the HDCP Licensee's Compliance and Robustness Rules. These rules ensure that HDCP implementations both protect the confidentiality of keys and other values from compromise, as well as deliver the desired protection for high value video content.

Alternatively, the content source application 102 may be implemented in a storage medium containing a plurality of programming instructions. When executed, the instructions direct the content source application 102 to: (1) select the protected content sink device 112 and receive an expected session identification code 218; (2) open a secure connection with a transmitter/codec unit 208 attached to the protected content sink device 112; (3) request the updated session identification code 214; and (4) compare the updated session identification code 214 against the expected session identification code 218. As such, the source application 102 ensures that the content stream 202 has not been routed to an unprotected content sink device 110/116. In such an embodiment, the content source device 100 includes a processor (not shown) to execute the plurality of programming instructions for implementing the content source application 102. Procedural method steps for implementing the teachings of the present invention are now described.

Operation

Referring now to FIG. 4, a method 300 is depicted for determining the scope of a content domain in order to ensure that a content stream is not re-routed to an unprotected or unauthorized display device, for example, in the content source device 100 as depicted in FIG. 1. At step 314, the content source application 102 selects a protected content sink device for display of a content stream. At step 322, the content source application stores an expected session identification code 218 of a display content stream path from which content is received by the protected content sink device, such as digital display 112, as depicted in FIG. 2. At step 324, the source application 102 opens a secure connection with a transmitter/codec unit 208 attached to the protected content sink device 112. At step 326, the source application begins transmitting the content stream (e.g., 202), which is received by the transmitter/codec unit 208 along with an updated session identification code (e.g., 214). The updated session identification code 214 is stored by the transmitter/codec unit 208 and identifies a display content stream path on which the content stream 202 was transmitted. At step 340, the content source application 202 requests the updated session identification code 214 from the transmitter/codec unit 208 using a content protection protocol, such as HDCP. Finally, at step 342, the updated session identification code 214 is compared against the expected session identification code 218 to ensure that the content display stream has not been routed to an unprotected content sink device. At step 352, steps 326–342 are repeated until the source application 102 has completed transmitting the content stream 202.

FIG. 5 depicts additional method steps 301 which occur prior to the selection of the protected content sink device 208, for example, in the graphics controller 200 as depicted in FIG. 3A. At step 302, the graphics controller 200 generates an input connection state (CS) 226 for a display content stream path. The input CS indicates which of the one or more input content streams (202–206) to the graphics controller 200 follow the display content stream path. For example, the display content stream path followed by the content stream 202 begins at pixel stream pipe A 222 and continues on to output port 234, via DVO port 242, to the first transmitter/codec 208 for display on the first digital device 112. At step 304, the graphics controller 200 generates a pipe identification code (pipe ID) for the display content stream path. The pipe ID indicates a pixel stream pipe traversed by content travelling along the display content stream path. At step 306, the graphics controller 200 generates an output connection state (CS) 230 for the display content stream path.

The output CS 230 indicates one or more ports that content traverses along the display content stream path. At step 308, a device identification code 262 for the display content stream path is generated, which uniquely identifies the graphics controller in which the display content stream path is contained, as depicted in FIG. 3B. Once step 308 is complete, the session identification code for the display content stream path can be formed. The session identification code includes the input connection state 226, the output connection state 230, the pipe identification code and the device identification code 268. At step 310, the session identification code is transmitted to each transmitter/codec unit attached to an output port from the one or more output ports indicated by the output connection state 230. Finally, at step 312, steps 302–310 are repeated for each display path within the graphics controller and for each graphics controller 200 within the content source device 100.

FIG. 6 depicts additional method steps 327 for transmitting the content stream 202 of step 326, for example, in the graphics controller 200 as depicted in FIGS. 3A and 3B. At step 328, the graphics controller 200 receives the content stream 202 from the source application 102 for display on the protected content sink device 112. At step 330, the graphics controller 200 transmits the updated session identification code 214 to the transmitter/codec unit 208 during, for example, a vertical blanking interval in the content stream 202. At step 332, the transmitter/codec unit 208 detects a vertical blanking interval signal within the content stream 202. However, those skilled in the art will realize that the updated session identification code can be transmitted during virtually any interval in the content stream 202. At step 334, the transmitter/codec unit 208 latches the updated session identification code 214 when the vertical blanking interval signal 406 is detected. At step 336, steps 330–334 are repeated until the source application 102 completes transmission of the content stream.

FIG. 7 depicts additional method steps 333 for performing the session identification code comparison of step 342. At step 344, the source application 102 receives a status word 264 from the transmitter/codec unit 208. The status word 264 (S) contains the updated session identification code 214 (status) concatenated with a digital signature (Kp), computed by the transmitter/codec unit 208 in accordance with a cryptographic protocol for ensuring data integrity, for example, the HDCP upstream protocol (S=status ||Kp). At step 346, the source application 102 computes a digital signature (Kp) across the status word 264 to verify the authenticity of the status word 264. At step 348, the updated session identification code 214 is compared against the expected session identification code 218. At step 350, when the updated session identification code 214 is not equal to the expected identification code 218, the source application 102 has detected re-routing of the content stream to an unprotected or unauthorized content sink device 110/116. Once detected, that the source application 102 discontinues transmission of the content stream 202.

FIG. 8 depicts additional method steps 315 for selecting the protected content sink device at step 314, for example, in the content-hardware interface 104 as depicted in FIG. 2. At step 316, a graphics driver (not shown) provides mode information for each content sink device (110, . . . , 116N) attached to the graphics controller 200 in response to a request from the source application 102. At step 318, the source application 102 selects, as the protected content sink device, a content sink device implementing a content protection protocol (as described above). Alternatively, the source application 102 also finds the transmitter/codec unit 208 with the help of the operating system (O/S) (e.g., Win32 or DirectX). The source application 102 can then make queries through the graphics driver to the get the transmitter/codec unit's expected session identification codes (218, . . . , 219N). Each transmitter/codec unit (208, . . . , 212N) has a unique set of keys, which are used in computing the HDCP values and the signature across of the status information. Any attempt to re-route the content stream 202 will result in the source application 102 receiving different key sets, or the transmitter/codec unit 208 receiving different updated session identification codes 214 (or none). In addition, the source application 102 will detect a mismatch between the status and the signature (S'=Kp'||status). Ultimately each of these cases is detectable by the source application 102.

Figure 9:
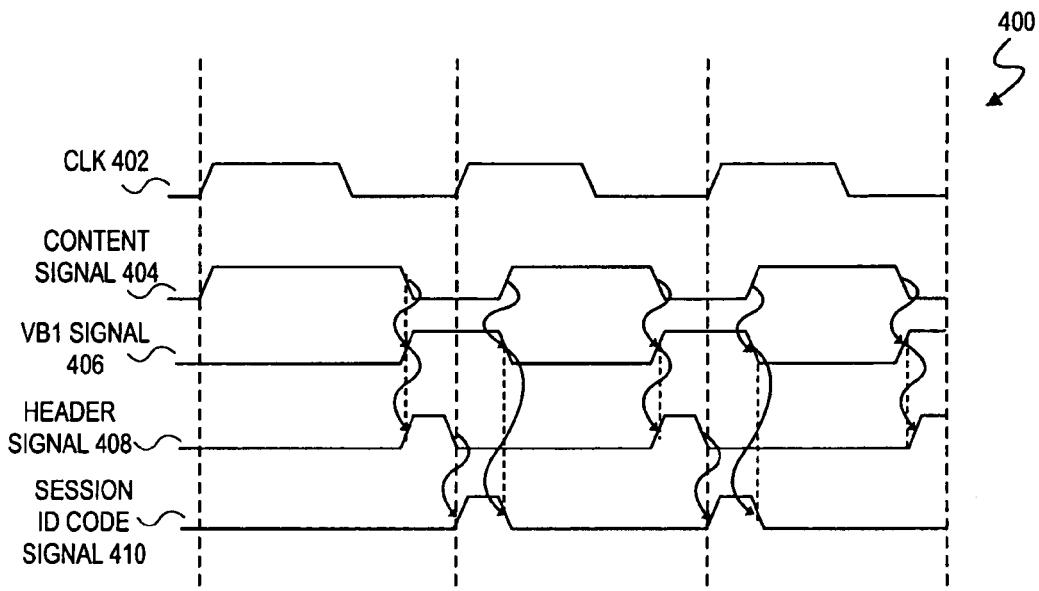
FIG. 9 depicts a timing diagram illustrating the functionality of the graphics controller as depicted in FIGS. 3A and 3B.
Figure 10:
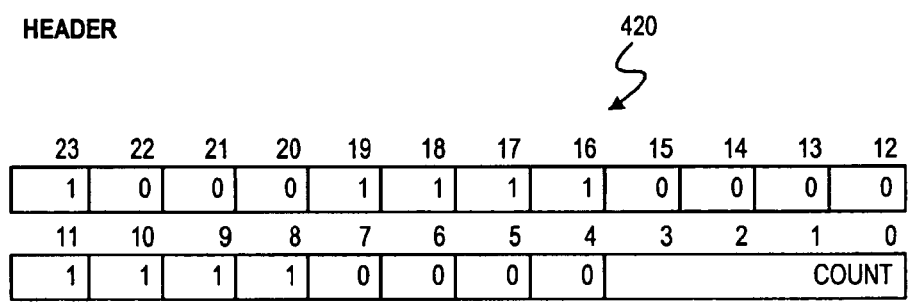
FIG. 10 depicts a header packet which is transmitted along with session identification code packets to a respective transmitter/code unit in accordance with a further embodiment of the present invention.

The transmission of the session identification code by the graphics controller 200 in a typical embodiment of the present invention is now described with reference to FIGS. 3A, 3B and 9. Referring to FIG. 9, a timing diagram 400 is depicted which illustrates the transmission of the session identification code (e.g., 214) during, for example, the vertical blanking interval of the content stream 202 to a transmitter/codec unit (e.g., 208). Alternatively, transmission of the session identification code 214 can occur during virtually any interval in the content stream, including but not limited to a horizontal blanking interval. The rising edge of a content signal 404 alerts the transmitter/codec unit 208 that content is being transmitted by the graphics controller 200. The falling edge of the content signal 404 triggers the rising edge of a vertical blanking interval signal (VBI) 406. When the transmitter/codec unit 208 detects a rising edge in the VBI signal 406, the transmitter/codec unit 208 prepares to latch the updated session identification code 214. The rising edge of the VBI signal 406 triggers a rising edge in a header signal 408. While the header signal 408 is active, the transmitter/codec unit 208 latches a header packet 420, as depicted in FIG. 10.

However, the header packet is optional; enabling the graphics controller to send additional status information to the transmitter/codec units within the content stream. This header packet 420 alerts the transmitter/codec unit 208 that packets containing the session identification code 214 are being transmitted and includes a number of the session identification code packets. The falling edge of the header signal 408 triggers a rising edge in a session code identification signal 410. While the session identification code signal 410 is active, the transmitter/codec unit 208 latches the session identification code packets 430 as depicted in FIG. 11. However, as depicted in FIG. 3B, when the content source device 100 supports multiple graphics controllers, the packets identifying (440A–440D) a unique device identification code 262 are transmitted along with the session identification code packets 430, as depicted in FIG. 12 (for a 40-bit device ID code). This process repeats for each vertical blanking interval signal 406 detected by the transmitter/codec unit 208.

Referring now to FIG. 11, which depicts the session identification code packet 430, one possible method for detection of duplication or re-routing or re-direction by a rogue agent is now described with reference to FIG. 3A. The session identification code packets can be organized in any manner reasonable for accessing the contents therein, as known to those skilled in the art. The application source 102 can detect that additional devices are attached to a display content output stream path. When a display content output stream path is not shared by multiple transmitter/codec units 208, a port attach state flags field 432 will show if any other transmitter/codec units are attached to the same pipe (pipe attach field 438). When additional transmitter/codec units 210/212 are attached to the same pipe, the source application 102 detects an attempted duplication. Alternatively, the source application may request the graphics driver to enumerate the available transmitter/codec units 210/212 which will reveal any attempts at duplicating the content stream 202 to additional transmitter/codec units 210/212.

The source application 102 can also detect re-routing and re-direction as follows. The source application 102 can initially get a list of available display devices and modes from the operating system (O/S) during initialization. Embedded in this list would be an expected session identification code. Consequently, prior to releasing the content stream 202, the source application 102 can verify that each end point (transmitter/codec unit) it finds has the same expected session identification code. A match between the expected session identification code the application thought it was connecting with initially and the one ultimately returned (updated session identification code), closes a loop ensuring the security of the connection. If the output was sent to another transmitter/codec unit, the port attach state flags field 432 will show this. If the output was re-directed to a different pipe, the pipe attach code 438 would be different. However, if the output was re-directed to a different adapter (graphics controller), the HDCP keys of that adapter's transmitter/codec unit would be different. Alternatively, the application can also verify that each transmitter/codec unit (208–212) has a unique cipher seed (AN) to detect re-routing performed by overlapping requests from one transmitter/codec unit 208 on to another.

As described above, the content protection protocol utilized by the present invention can include HDCP and specifically, the upstream protocol for HDCP. The upstream protocol is known to those skilled in the art as content protection, enabling a cryptographic exchange between software and graphics hardware. The protocol requires a set of cryptographic keys for each protocol endpoint. Using these keys, devices implementing the HDCP upstream protocol can ensure that any received data is valid by generating a digital signature across the received data. Additional details regarding HDCP or the upstream protocol are known to those skilled in the art of content protection and, therefore, are omitted to avoid obscuring the details of the present invention.

Several aspects of one implementation of a content source device supporting multiple display outputs and methods for ensuring content protection therein have been described. However, various implementations of the multiple display output content source device provide numerous features including, complementing, supplementing, and/or replacing the features described above. Features can be implemented as hardware components or software components of a computer system in different implementations.

It is to be understood that even though numerous characteristics and advantages of various embodiments of the present invention have been set forth in the foregoing description, together with details of the structure and function of various embodiment of the invention, this disclosure is illustrative only. Changes may be made in detail, especially matters of structure and management of parts within the principles of the present invention to the full extent indicated by the broad general meaning of the terms in which the appended claims are expressed. For example, the particular element may vary depending on the particular application for the novel mixed storage format while maintaining substantially the same functionality without departing from the scope and spirit of the present invention.

In addition, although the preferred embodiment described herein is directed to a graphics controller supporting multiple display outputs, it will be appreciated by those skilled in the art that the teaching of the present invention can be applied to other systems. In fact, systems for integrated graphics controllers are within the teachings of the present invention, without departing from the scope and spirit of the present invention. In addition, the session identification codes can be sent to the transmitter/codec units during virtually any interval in the content stream. Finally, the session identification code packet can be organized in virtually any manner desired.

The present invention provides many advantages over known techniques. The present invention includes the ability of application software, which is responsible for insuring that a downstream path in which premium content is transmitted complies with the licensing requirements of the premium content it is handling, to use a session identifier code, along with other values already provided by the HDCP Upstream Protocol, to detect attempts to "hide" or reroute a transmitter/code component from its view. The novelty arises from the use of adapter/pipe/port identifiers buried within the transmitter/codec units (protected from alteration by software or other user-accessible means) as a method, in conjunction with the HDCP Upstream Protocol, to provide the application a means of assessing the entire scope of where the premium content is going once it is dropped into the graphics controller. Additionally, the method used to passing this information via a time-multiplexed hardware mechanism over the transmitter/codec interface is a key-feature to the simplicity, robustness and security of this approach.

Having disclosed exemplary embodiments and the best mode, modifications and variations may be made to the disclosed embodiments while remaining within the scope of the invention as defined by the following claims.

What is claimed is:

1. A method comprising:
   selecting a protected content sink device for display of a content stream, the selecting further comprising:
      requesting, by the source application, a graphics driver to provide mode information for each content sink device attached to a graphics controller, the mode information describing a display content stream path used to route content to the protected content sink device; and
      selecting, as the protected content sink device, a content sink device implementing a content protection protocol based on the mode information provided by the graphics driver thereby ensuring no unauthorized duplication of content displayed by the content sink device;
   storing, by a content stream source application, an expected session identification code of a display content stream path from which content is received by the protected content sink device;
   opening a secure connection between the content stream source application and a transmitter/codec unit attached to the protected content sink device;
   transmitting the content stream to the transmitter/codec unit along with an updated session identification code that is stored by the transmitter/code unit and identifies the display content stream path on which the content stream was transmitted;
   requesting, by the content stream source application, the updated session identification code from the transmission/codec unit using a content protection protocol; and
   comparing the updated session identification code received from the transmitter/codec unit against the expected session identification code to ensure that the content display stream has not been routed to an unprotected content sink device,
   wherein prior to the selecting the protected content sink device, the method further comprises:
   generating a series of session identification codes for each display content stream path supported by a graphics controller; and
   transmitting by the graphic controller, a session identification code to a corresponding transmitter/codec unit from the series of session identification codes for each transmitter/code unit attached to the graphics controller, and
   wherein the generating the series of session identification codes further comprises:
   generating an input connection state for a display content stream path indicating one or more input content streams to the graphics controller that follow the display content stream path;
   generating a pipe identification code for the display content stream path indicating a pixel stream pipe traversed by the display content stream path;
   generating an output connection state for the display content stream path indicating one or more output ports that the display content stream path traverses;
   generating a device identification code for the display content stream path uniquely identifying the graphics controller in which the display content stream path is contained, such that the session identification code for the display content stream path includes the input connection state, the output connection state, the pipe identification code and the device identification code;

transmitting the session identification code to each transmitter/codec unit attached to an output port from the one or more output ports indicated by the output connection state; and repeating the generating, generating, generating, generating and transmitting steps for each display content stream path of each graphics controller.

2. The method of claim 1, wherein transmitting the session identification code to the transmission/codec unit further comprises:

receiving, by a graphic controller, the content stream from the content stream source application for display on the protected content sink device;

transmitting the updated session identification code to the transmission/codec unit during a vertical blanking interval in the content stream;

detecting, by the transmission/codec unit, a vertical blanking interval signal within the content stream;

latching, by the transmission/codec unit, the updated session identification code when the vertical blanking interval signal is detected; and repeating the transmitting, detecting and latching steps for a duration of the content steam.

3. The method of claim 1, further comprising:

performing the transmitting, requesting and comparing after a predetermined period of time; and repeating the performing while the content stream is displayed on the protected content sink device.

4. The method of claim 1, wherein comparing the session identification code further comprises:

receiving a status word containing the updated session identification code from the transmitter/codec unit;

computing a digital signature across the status word to verify the authenticity of the status word; and comparing the updated session identification code against the expected session identification code; and when the updated session identification code is not equal to the expected session identification code, discontinuing transmission of the content stream.

5. A method comprising:

generating a series of session identification codes for each display content stream path supported by a graphics controller, the generating comprising:

generating an input connection state for a display content stream path indicating one or more input content streams to the graphics controller that follow the display content stream path;

generating a pipe identification code for the display content stream path indicating a pixel stream pipe traversed by the display content stream path;

generating an output connection state for the display content stream path indicating one or more output ports that the display content stream path traverses;

generating a device identification code for the display content stream path uniquely identifying the graphics controller in which the display content stream path is contained, such that the session identification code for the display content stream path includes the input connection state, the output connection state, the pipe identification code and the device identification code;

transmitting the session identification code to each transmitter/codec unit attached to an output port from the one or more output ports indicated by the output connection state; and repeating the generating, generating, generating, generating and transmitting steps for each display content stream path of each graphics controller;

transmitting, by the graphic controller, a session identification code to a corresponding transmitter/codec unit from the series of session identification codes for each transmitter/code unit attached to the graphics controller;

selecting a protected content sink device for display of a content stream;

storing, by a content stream source application, an expected session identification code of a display content stream path from which content is received by the protected content sink device;

opening a secure connection between the content stream source application and a transmitter/codec unit attached to the protected content sink device;

transmitting the content stream to the transmitter/codec unit along with an updated session identification code that is stored by the transmitter/code unit and identifies a display content stream path on which the content steam was transmitted;

requesting, by the content stream source application, the updated session identification code from the transmission/codec unit using a content protection protocol; and comparing the updated session identification code received from the transmitter/codec unit against the expected session identification code to ensure that the content display stream has not been routed to an unprotected content sink device, wherein the generating the device identification code further comprises:

submitting a device code of a respective graphic controller to a linear feedback shift register; and clocking the linear feedback shift register at a pixel rate of the content display stream to ensure the device code of the respective graphic controller is unique.

6. An apparatus comprising:

one or more transmitter/codec units, each attached to a respective display content stream path from which content is received and each to store an expected session identification code identifying the respective display content stream path attached to the transmitter/codec unit;

a graphics controller to transmit content to transmitter/codec units attached to a display content steam path along with an updated session identification code that is stored by the transmitter/code units and to identify the display content stream path on which the content stream was transmitted;

one or more content sink devices display content transmitted by the graphics controller;

a content source application to select a protected content sink device for display of a content stream, to open a secure connection with a transmitter/codec unit attached to the protected content sink device, to request the updated session identification code from the transmission/codec unit using a content protection protocol and to compare the updated session identification code against the expected session identification code to ensure that the content display stream has not been routed to an unprotected content sink device; and a graphics driver to provide mode information for each content sink device attached to the graphics controller in response to a request by the source application, the mode information describing a display content stream path used to route content to the protected content sink device such that the source application selects, as the protected content sink device, a content sink device implementing a content protection protocol based on the mode information ensuring no unauthorized duplication of content displayed by the content sink device, wherein the graphics controller includes:

an input selection device having one or more input content streams as inputs and one or more pixel stream pipes as outputs, receives the content stream and directs the content stream to a pixel stream pipe along a display content stream path identified by the updated session identification code using input selection information;

a blender that receives the content stream and mixes context planes within the content stream into a content pixel stream prior to being provided to the pixel stream pipe;

an output selection device having the one or more pixel stream pipes as inputs and one or more output ports as outputs, receives the content pixel stream from the pixel stream pipe and directs the content pixel stream to an output port along the display content stream path using output selection information; and a sequencer transmits the updated session identification code to the transmission/codec unit during a vertical blanking interval in the content stream provided by the source application.

7. The apparatus of claim 6, further comprising:
one or more digital visual output ports, such that each transmitter/codec unit is coupled to the graphics controller by a respective digital visual output port from the one or more digital visual output ports.

8. An apparatus, comprising:
one or more transmitter/codec units, each attached to a respective display content stream path from which content is received and each stores an expected session identification code identifying the respective display content stream path attached to the transmitter/codec unit;

a graphics controller transmits content to transmitter/codec units attached to a display content stream path along with an updated session identification code that is stored by the transmitter/code units and identifies the display content stream path on which the content stream was transmitted, the graphics controller including:

an input selection device having one or more input content streams as inputs and one or more pixel stream pipes as outputs, receives the content stream and directs the content stream to a pixel stream pipe along a display content stream path identified by the updated session identification code using input selection information;

a blender that receives the content stream and mixes context planes within the content stream into a content pixel stream prior to being provided to the pixel stream pipe;

an output selection device having the one or more pixel stream pipes as inputs and one or more output ports as outputs, receives the content pixel stream from the pixel stream pipe and directs the content pixel stream to an output port along the display content stream path using output selection information; and a sequencer transmits the updated session identification code to the transmission/codec unit during a vertical blanking interval in the content stream provided by the source application;

one or more content sink devices display content transmitted by the graphics controller; and a content source application selects a protected content sink device for display of a content stream, opens a secure connection with a transmitter/codec unit attached to the protected content sink device, requests the updated session identification code from the transmission/codec unit using a content protection protocol and compares the updated session identification code against the expected session identification code to ensure that the content display stream has not been routed to an unprotected content sink device, wherein the graphics controller further comprises:
a linear feedback shift register that receives a device code of a respective graphics controller and is clocked at a pixel rate of the content display stream to ensure the device code of the respective graphics controller is unique, such that the updated session identification code for the display content stream path includes the input selection information, the output selection information, a pipe identification code identifying the pixel stream pipe traversed by the content stream and the unique device code.

9. An apparatus comprising:
one or more transmitter/codec units, each storing an expected session identification code identifying a display content stream path from which content is received and transmitting the content to a content sink device;

a graphics controller transmitting content to the one or more transmitter/codec units along with an updated session identification code that is stored by the transmitter/code unit and identifies a display content stream path on which the content stream was transmitted;

a storage medium containing a plurality of programming instructions implements a content source application which, when executed, directs content source application to select a protected content sink device from a one or more content sink devices for display of a content stream, opens a secure connection with a transmitter/codec unit attached to the protected content sink device requests the updated session identification code from the transmission/codec unit using a content protection protocol and compares the updated session identification code against the expected session identification code to ensure that the content display stream has not been routed to an unprotected content sink device;

a processor to execute the plurality of program instructions; and a graphics driver to provide mode information for each content sink device attached to the graphics controller in response to a request by the source application, the mode information describing a display content stream path used to route content to the protected content sink device such that the source application selects, as the protected content sink device, a content sink device implementing a content protection protocol based on the mode information ensuring no unauthorized duplication of content displayed by the content sink device, wherein the graphics controller includes:
an input selection device having one or more input content streams as inputs and one or more pixel stream pipes as outputs, receives the content stream and directs the content stream to a pixel steam pipe along a display content stream path identified by the updated session identification code using input selection information;

a blender that receives the content stream and mixes context planes within the content stream into a content pixel stream prior to being provided to the pixel stream pipe;

an output selection device having the one or more pixel stream pipes as inputs and one or more output ports as outputs, receives the content pixel stream from the pixel stream pipe and directs the content pixel stream to an output port along the display content stream path using output selection information; and a sequencer transmits the updated session identification code to the transmission/codec unit during a vertical blanking interval in the content stream provided by the source application.

10. The apparatus of claim 9, further comprising:

one or more digital visual output ports, such that each transmitter/codec unit is coupled to the graphics controller by a respective digital visual output port from the one or more digital visual output ports.

11. An apparatus comprising:

one or more transmitter/codec units, each storing an expected session identification code identifying a display content stream path from which content is received and transmitting the content to a content sink device;

a graphics controller transmitting content to the one or more transmitter/codec units along with an updated session identification code that is stored by the transmitter/code unit and identifies a display content stream path on which the content stream was transmitted, the graphics controller including:

an input selection device having one or more input content streams as inputs and one or more pixel stream pipes as outputs, receives the content stream and directs the content stream to a pixel stream pipe along a display content stream path identified by the updated session identification code using input selection information;

a blender that receives the content steam and mixes context planes within the content stream into a content pixel stream prior to being provided to the pixel stream pipe;

an output selection device having the one or more pixel stream pipes as inputs and one or more output ports as outputs, receives the content pixel stream from the pixel stream pipe and directs the content pixel stream to an output port along the display content stream path using output selection information; and a sequencer transmits the updated session identification code to the transmission/codec unit during a vertical blanking interval in the content stream provided by the source application;

a storage medium containing a plurality of programming instructions implements a content source application which, when executed, directs content source application to select a protected content sink device from a one or more content sink devices for display of a content stream, opens a secure connection with a transmitter/codec unit attached to the protected content sink device, requests the updated session identification code from the transmission/codec unit using a content protection protocol and compares the updated session identification code against the expected session identification code to ensure that the content display stream has not been routed to an unprotected content sink device; and a processor to execute the plurality of program instructions, wherein the graphics controller further comprises:

a linear feedback shift register that receives a device code of a respective graphics controller and is clocked at a pixel rate of the content display stream to ensure the device code of the respective graphics controller is unique, such that the update session, identification code for, the display content stream path includes the input selection information, the output selection information, a pipe identification code identifying the pixel stream pipe traversed by the content stream and the unique device code.

12. An article of manufacture comprising:

a storage medium have stored thereon a plurality of programming instructions implementing a content source application which, when executed, direct the source application to select a protected content sink device for display of a content stream having an attached transmitter/codec unit containing an expected session identification code, open a secure connection with the transmitter/codec unit, transmit the content stream to the transmitter/codec unit along with an updated session identification code that is stored by the transmitter/code unit and identifies a display content stream path on which the content stream was transmitted, and request the updated session identification code from the transmitter/codec unit and compare the updated session identification code received from the transmitter/codec unit against the expected session identification code to ensure that the content display stream has not been routed to an unprotected content sink device, wherein the instruction for selecting the protected content sink device further includes instructions for:

requesting, by the source application, a graphics driver to provide mode information for each content sink device attached to a graphics controller, the mode information describing a display content stream path used to route content to the protected content sink device; and selecting, as the protected content sink device, a content sink device implementing a content protection protocol based on the mode information provided by the graphics driver ensuring no unauthorized duplication of content displayed by the content sink device, and further comprising instructions to be executed prior to selecting the protected content sink device, wherein the instructions when executed direct the source application to:

generate a series of session identification codes for each display content stream path supported by a graphics controller;

transmit, by the graphics controller, a session identification code to a corresponding transmitter/codec unit from the series of session identification codes for each transmitter/code unit attached to the graphics controller, and wherein the generating the series of session identification codes further comprises instructions to:

generate an input connection state for a display content stream path indicating one or more input content streams to the graphics controller that follow the display content stream path;

generate a pipe identification code for the display content stream path indicating a pixel stream pipe traversed by the display content stream path;

generate an output connection state for the display content stream path indicating one or more output ports that the display content stream path traverses;

generate a device identification code for the display content stream path uniquely identifying the graphics controller in which the display content stream path is contained such that the session identification code for the display content stream path includes the input connection state the output connection state, the pipe identification code and the device identification code;

transmit the session identification code to each transmitter/codec unit attached to an output port from the one or more output ports indicated by the output connection state; and repeat the generating, generating, generating, generating and transmitting steps for each display content stream path of each graphics controller.

13. The article of manufacture of claim 12, wherein the instruction for transmitting the session identification code to the transmission/codec unit further includes instructions for:

receiving, by a graphic controller, the content stream from the content stream source application for display on the protected content sink device;

transmitting the session identification code to the transmission/codec unit during a vertical blanking interval in the content stream;

detecting, by the transmission/codec unit, a vertical blanking interval signal within the content display steam;

latching, by the transmission/codec unit, the session identification code when the vertical blanking interval signal is detected; and repeating the transmitting, detecting and latching steps for a duration of the content stream.

14. The article of manufacture of claim 12, further including instructions for:

performing the transmitting, requesting and comparing steps after a predetermined period of time; and repeating the performing step while the content stream is displayed on the protected content sink device.

15. The article of manufacture of claim 12, wherein the instruction for comparing the session identification code further includes instructions for:

receiving a status word containing the updated session identification code from the transmitter/codec unit;

computing a digital signature across the status word to verify the authenticity of the status word;

comparing the updated session identification code against the expected session identification code; and when the updated session identification code is not equal to the expected session identification code, discontinuing transmission of the content stream.

16. An article of manufacture comprising:

a storage medium have stored thereon a plurality of programming instructions implementing a content source application which, when executed:

generate a series of session identification codes for each display content steam path supported by a graphics controller;

transmit, by the graphic controller, a session identification code to a corresponding transmitter/codec unit from the series of session identification codes for each transmitter/code unit attached to the graphics controller;

direct the source application to select a protected content sink device for display of a content stream having an attached transmitter/codec unit containing an expected session identification code;

open a secure connection with the transmitter/codec unit;

transmit the content stream to the transmitter/codec unit along with an updated session identification code that is stored by the transmitter/code unit and identifies a display content stream path on which the content stream was transmitted;

request the updated session identification code from the transmitter/codec unit; and compare the updated session identification code received from the transmitter/codec unit against the expected session identification code to ensure that the content display stream has not been routed to an unprotected content sink device, wherein the instruction for generating the series of session identification codes further includes instructions for:

generating an input connection state for a display content stream path indicating one or more input content streams to the graphics controller that follow the display content stream path;

generating a pipe identification code for the display content stream path indicating a graphic controller pipe traversed by the display content stream path;

generating an output connection state for the display content stream path indicating one or more output ports that the display content stream path tranverses;

generating a device identification code for the display content stream path uniquely identifying the graphics controller in which the display content stream path is contained, such that the session identification code for the display content stream path includes the input connection state, the output connection state, the pipe identification code and the device identification code; and repeating the generating, generating, generating and generating steps for each display content stream path of each graphics controller.

17. The article of manufacture of claim 16, wherein the instruction for the generating the device identification code further includes instructions for:

submitting a device code of a respective graphic controller to a linear feedback shift register; and clocking the linear feedback shift register at a pixel rate of the content display stream to ensure the device code of the respective graphic controller is unique.

* * * * *

UNITED STATES PATENT AND TRADEMARK OFFICE
CERTIFICATE OF CORRECTION

| | | |
|---|---|---|
| PATENT NO. | : 7,114,168 B1 | Page 1 of 1 |
| APPLICATION NO. | : 09/675823 | |
| DATED | : September 29, 2000 | |
| INVENTOR(S) | : Wyatt et al. | |

It is certified that error appears in the above-identified patent and that said Letters Patent is hereby corrected as shown below:

In column 14, at line 51, delete "steam" and insert --stream--.

In column 17, at line 1, delete "steam" and insert --stream--.

In column 17, at line 43, delete "steam" and insert --stream--.

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,114,168 B1 Page 1 of 1
APPLICATION NO. : 09/675823
DATED : September 26, 2006
INVENTOR(S) : Wyatt et al.

It is certified that error appears in the above-identified patent and that said Letters Patent is hereby corrected as shown below:

In column 14, at line 51, delete "steam" and insert --stream--.

In column 17, at line 1, delete "steam" and insert --stream--.

In column 17, at line 43, delete "steam" and insert --stream--.

This certificate supersedes Certificate of Correction issued April 3, 2007.

Signed and Sealed this

Eighth Day of May, 2007

JON W. DUDAS
*Director of the United States Patent and Trademark Office*